United States Patent [19]
Hyman et al.

[11] 3,911,280
[45] Oct. 7, 1975

[54] METHOD OF MEASURING A PROFILE OF THE DENSITY OF CHARGED PARTICLES IN A PARTICLE BEAM

[75] Inventors: Lloyd G. Hyman, La Grange Park; Donald J. Jankowski, Bolingbrook, both of Ill.

[73] Assignee: The United States of America as represented by the United States Energy Research and Developement Administration, Washington, D.C.

[22] Filed: Apr. 11, 1974

[21] Appl. No.: 460,228

[52] U.S. Cl. .............................................. 250/395
[51] Int. Cl.² ........................................... G01T 1/16
[58] Field of Search .......... 250/306, 307, 336, 370, 250/371, 390, 391, 392, 394, 395, 423, 424, 489, 396–398; 324/33, 71 CP

[56] References Cited
UNITED STATES PATENTS

| | | | |
|---|---|---|---|
| 3,546,577 | 12/1970 | Hornstra, Jr. et al. | 250/423 X |
| 3,710,113 | 1/1973 | Padawer | 250/307 |
| 3,711,714 | 1/1973 | Klar et al. | 250/390 |
| 3,819,946 | 6/1974 | Fracke et al. | 250/390 X |

*Primary Examiner*—Davis L. Willis
*Attorney, Agent, or Firm*—Dean E. Carlson; Arthur A. Churm; Donald P. Reynolds

[57] ABSTRACT

A profile of the relative density of charged particles in a beam is obtained by disposing a number of rods parallel to each other in a plane perpendicular to the beam and shadowing the beam. A second number of rods is disposed perpendicular to the first rods in a plane perpendicular to the beam and also shadowing the beam. Irradiation of the rods by the beam of charged particles creates radioactive isotopes in a quantity proportional to the number of charged particles incident upon the rods. Measurement of the radioactivity of each of the rods provides a measure of the quantity of radioactive material generated thereby and, together with the location of the rods, provides information sufficient to identify a profile of the density of charged particles in the beam.

10 Claims, 4 Drawing Figures

U.S. Patent    Oct. 7, 1975    3,911,280
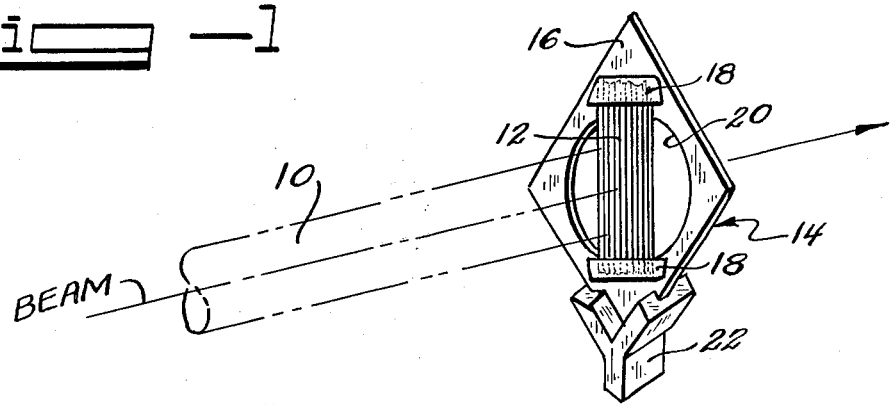
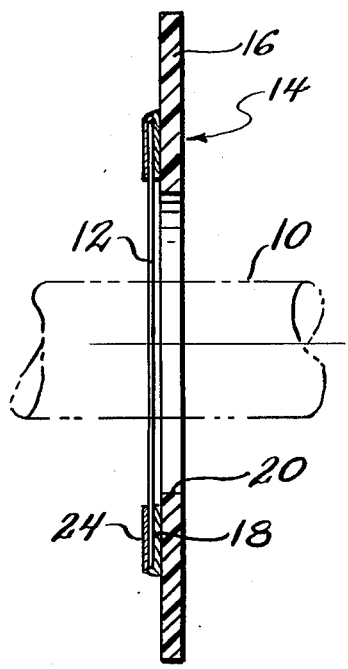
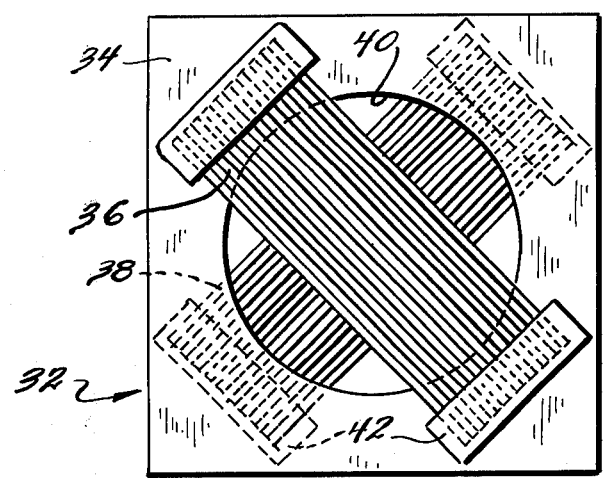
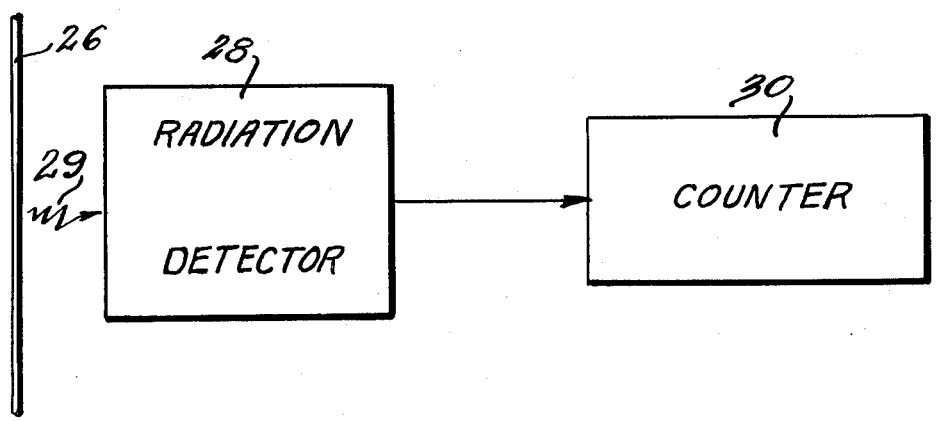

METHOD OF MEASURING A PROFILE OF THE DENSITY OF CHARGED PARTICLES IN A PARTICLE BEAM

CONTRACTUAL ORIGIN OF THE INVENTION

The invention described herein was made in the course of, or under, a contract with the U.S. ATOMIC ENERGY COMMISSION.

BACKGROUND OF THE INVENTION

The present invention relates to the determination of a profile of the relative density of charged particles in a beam of charged particles. It is of special utility where the density profile must be known with usual precision.

An important aspect of the operation of any particle accelerator involves determining various parameters of the beam produced by the accelerator. For some experiments, a measure of the total number of particles accelerated per pulse or an integrated version of this information to supply a total number of particles accelerated over a period of time will suffice. This assumes that the particles are defined sufficiently in location to stay within a beam. Such information could be obtained destructively by inserting a device such as a Faraday cup and measuring the current collected therein over a period of time. If this measurement is performed on a sampling basis, the information obtained thereby is of use in determining total number of particles accelerated over a given period. However, this method is not well adapted to determining the position of the beam or the particle-density profile of the beam. The density profile is here defined to mean a plot of particle density as a function of position. Several techniques have been used to determine density profiles of beams. One apparatus for measuring such a profile in an accelerator beam was taught by Hornstra et al. in U.S. Pat. No. 3,546,577. Hornstra et al. teach collection of the ion pairs produced by collision of a particle beam with residual gas molecules in an accelerator. The use of a plurality of spaced electrodes in Hornstra et al. associates the collected ion density with the locations from which they were ionized and hence provides a measure of the density of charged particles at that point. The apparatus of Hornstra et al. is sensitive to variations in gas pressure at the location of the beam, and must be calibrated for such pressures. In addition the collecting electrodes of Hornstra et al. are disposed adjacent to the beam, providing the possibility of uncertainty of the location of the ionizing collision.

Another technique that is used to measure the density profile in a beam is the segmented wire ionization chamber (SWIC). This is typically a plurality of wires placed parallel to one another in a plane perpendicular to the beam, and also placed in close proximity to a conducting plane that is disposed perpendicular to the beam. The assembly of the wires and conducting plane is disposed to shadow the entire beam. A plurality of pulse counters, one connected to each of the wires, provides a pulse each time a charged particle produces an ionizing event that is detected as a current in the wire. The wires in a SWIC must be insulated from each other and this is normally accomplished by spacing each wire a short distance from those adjacent to it. An ionizing collision resulting from the passage of a particle midway between two wires has approximately an equal probability of being detected by either of the wires. There is thus a degree of uncertainty of position that is a function of the number and diameter of wires used in the chamber. It is evident that the cost and complexity increase with an increase in the number of such wires.

Another method of determining the density profile of a particle beam comprises placing a thin foil of material such as gold in the beam so that it becomes radioactive. The foil is then removed from the beam and is placed in direct contact with an X-ray film which is then developed and scanned with an optical densitometer. The darkening of the film at any particular location is proportional to the amount of X-ray exposure it has received at that location, which in turn is proportional to the density of particles in the beam incident on that particular location. This method has been observed to produce density profiles which indicate a beam that appears to be larger than it actually is. It is also evident that the use of this method introduces a considerable time delay due to the necessity of exposing, developing and measuring the X-ray film.

Gold foil may also be used to obtain a density profile by making use of the fact that bombardment of gold with protons produces $^{149}$Tb, a radioactive terbium producing alpha particles upon disintegration. Scanning the gold foil, after bombardment, in an alpha counter having a slit mask is a well-known technique of producing a profile of particle density as a function of position.

It is an object of the present invention to provide a better method of measuring the density profile of a beam of charged particles.

It is a further object of the present invention to provide a method of measuring a density profile of a beam of charged particles with better accuracy.

It is a further object of the present invention to provide a nondestructive measure of beam density as a function of position in a beam of charged particles.

It is a further object of the present invention to provide a method of measuring simply, with speed and accuracy, the density of charged particles in a beam as a function of position.

Other objects will become apparent in the course of a detailed description of the invention.

SUMMARY OF THE INVENTION

A density profile of a beam of charged particles is obtained by disposing in a cross section of the beam a number of rods of a material that transmutes to a radioactive element under bombardment. The rods are placed so as to cover completely the shadow of the beam. After the rods are irradiated by the beam, they are exposed individually to a detector of gamma radiation sensitive to the frequency produced by the transmuted isotopes. A count of the radioactivity from these isotopes provides a measure of the charged particle density at the associated position in the beam. If the beam exhibits cylindrical symmetry of density, one array of parallel rods will suffice. Otherwise, a second orthogonal array parallel to the first will provide sufficient information for a complete density profile of the beam.

BRIEF DESCRIPTION OF THE DRAWINGS

FIG. 1 is a schematic view of a holder assembly disposed in a beam for the practice of the present invention;

FIG. 2 is a side view of a vertical section through the center of the holder assembly of FIG. 1;

FIG. 3 is a block diagram of means for measuring radiation from the rods of FIGS. 1 and 2;

FIG. 4 is a front view of an alternate embodiment of the holder assembly of FIG. 1.

DETAILED DESCRIPTION OF THE PREFERRED EMBODIMENT

In FIG. 1, beam 10 is a beam of charged particles from a typical particle accelerator. Beam 10 is caused to impinge upon rods 12, which are disposed parallel to and touching one another in a plane perpendicular to beam 10. Rods 12 form a portion of holder assembly 14, which comprises support 16 and contact tape 18 to attach rods 12 to support 16. Support 16 also has a passage 20 through which beam 10 is directed. Mount 22 supports holder assembly 14 in position in beam 10.

Further understanding of the invention may be had from FIG. 2 which is a vertical section taken through the center of the holder assembly 14 of FIG. 1. In FIG. 2, rods 12 are disposed to intercept beam 10 which passes through passage 20 of support 16. Contact tape 18 affixes rods 12 to support 16. It is convenient to use a double-sided contact tape 18 between rods 12 and support 16 and it is convenient, though not necessary, further to secure rods 12 by an additional layer 24 of contact tape.

The exposure of rods 12 to beam 10 in FIGS. 1 and 2 will cause transmutation of elements in the rods 12 in an amount that is proportional to the particle flux intercepted by each of said rods. Following such exposure, the rods are applied to the apparatus of FIG. 3 which is a block diagram of a radiation detector. In FIG. 3, a single rod 26 has been removed from the holder assembly 14 of FIGS. 1 and 2 is disposed adjacent to a radiation detector 28 for measurement of the radiation 29 emitted by rod 26. Detected radiation 29 is counted in counter 30 for a predetermined period of time. The count obtained at counter 30, corrected if necessary to reflect changes in activity associated with passage of the half-life of the radioactive element produced by impact of the beam, is associated with the previously known position of the rod 26. Each of the rods 12 in FIGS. 1 and 2 is measured in turn and the combined results from all of the rods 12 provide a measure of the relative density of the charged particles in beam 10.

The holder assembly 14 of FIGS. 1 and 2 is most useful when the beam 10 is known to have cylindrical symmetry. Such beams from accelerators frequently exhibit density profiles that are elliptical. For dealing with such beams or, in fact, for dealing with beams that are asymmetric in density, an alternate embodiment of a holder assembly is shown in FIG. 4. In FIG. 4, holder assembly 32 comprises a support 34 which is similar to the support 16 of FIGS. 1 and 2. Attached to support 34, however, are a first set of rods 36 and a second set of rods 38. First set of rods 36 comprises a plurality of rods disposed parallel to and touching one another, the first set of rods 36 being disposed in a plane that is perpendicular to the expected direction of an incident beam. The second set of rods 38 is disposed so that the rods are parallel to each other and perpendicular both to the first set of rods 36 and to the direction of an incident beam. Both first set of rods 36 and second set of rods 38 cover an aperture 40 which is intended to permit unimpeded passage of a beam. As in FIGS. 1 and 2, rods are affixed to support 34 by contact tape 42.

The present invention has been practiced in a portion of an accelerator beam that was in air. The only portion of holder assembly 14 of FIGS. 1 and 2 or of holder assembly 32 of FIG. 4 that was exposed to a hostile environment was rods 12 of FIGS. 1 and 2 and first and second sets of rods 36 and 38 of FIG. 4. Under these circumstances, it was appropriate to make support 16 and support 34 of polymerized methyl methacrylate, sold under the trademarks Plexiglas or Lucite, and to use conventional contact tape to support the rods in position. It is conceivable that under some circumstances it might be desirable or necessary to practice the present invention in the vacuum environment on the inside of a particle accelerator. In such a case, the only modification necessary would be to insure that the materials used would withstand and would not degrade the necessary vacuum environment. In this case it would be necessary to use especial care to clean the rods and the holder and any conventional clamp would be useful to affix the rods too the holder. The principles of the invention would not otherwise be changed.

The instant invention has been applied to obtain accurate profiles of particle beams on the Zero Gradient Synchrotron at the Argonne National Laboratory. In a particular experiment on this accelerator, it was especially important to have a precise and accurate measurement of the width of the particle beam. An apparatus according to the principles of the present invention was made by placing aluminum rods of 1 mm diameter in an orthogonal array covering the beam, as shown in FIG. 4. The impact of protons on the aluminum rods has no measurable effect upon the beam but causes transmutation of the aluminum to sodium-24 ($Na^{24}$). The radioactive sodium emits a gamma ray with an energy of 1.37 MeV and a half-life of 15.0 hours. This gamma ray is relatively easy to detect and it is easy to separate from the masking effects of other radioactive disintegrations. Measurements were performed using a lithium-drifted germanium detector in a geometry which was insensitive to the exact location of the aluminum rod. The same measuring distance was used for each rod, and the requirements of determining a profile of relative density are satisfied if relative rather than absolute measures of transmutations are obtained. This technique allows two possibilities for varying the measurement. First, it is possible to measure lower intensities of particles by using a large crystal of thallium-drifted sodium iodide. Second, if it is desired to achieve an integrated particle density profile over a long period of time such as several days or weeks, it is possible to use $Na^{22}$ as the transmuted element that is measured. This element produces a gamma ray having an energy of 2.74 MeV and a half-life of 2.6 years.

When the instant invention was practiced, it was convenient to use round rods of aluminum having a diameter of 1 mm. The particular dimension used was chosen for comparison of the resolution with other measuring methods. It is evident that the shape, material and dimensions of the rods are matters of design choice. For example, if square cross sections or strips of material were available, they could be used instead of round rods. Materials other than aluminum producing different elements on transmutation could equally as well be used. The operating considerations are these: First, the materials chosen should have a width in the beam that corresponds to the desired precision of density measurement. Second, the rods should be capable of supporting themselves across the aperture in the holder. Third, the element to which the rods are transmuted should be one for which measuring equipment is readily available. Fourth, the material of the rods should be free of impurities that will cause interfering radioactive elements upon exposure to a beam. Examples of usable materials in addition to aluminum include iron, gold, and copper.

The present invention has been practiced upon a beam that exhibited elliptical symmetry of density in cross section. Results for such a beam are most readily interpreted when the directions of the orthogonal sets of rods are along the major and minor axes of the ellipse. This is not, however, necessary in that routine signal processing means applied to the counts of radioactivity as a function of position for each of the rods will permit the construction of a particle density profile for any beam with a resolution of the order of the area of a square having dimensions of the diameter of a rod.

When the present invention was practiced to obtain a profile of the particle density in a beam of protons, the results obtained were of especial importance in determining the edge of the beam. This is customarily described as the full-width half-maximum (FWHM) dimension, taken arbitrarily to be the edge of the beam. A run totalling $3 \times 10^{14}$ protons at 12.5 GeV at the Zero Gradient Synchrotron at Argonne National Laboratory was monitored by a SWIC, a gold foil, and the present invention. The gold foil was used on both X-ray and alpha detection. Comparative results are tabulated below.

| Method | Width (FWHM) in mm. |
| --- | --- |
| SWIC | 6.6 |
| Gold: X-ray film | 5.8 |
| Gold: alpha | 4.6 |
| Aluminum rods | 4.4 |

The SWIC and X-ray methods indicate erroneously high results compared to the alpha detector and to the aluminum rods of the present invention. The latter two methods are believed correct within measuring error. The aluminum rods of the present invention were easier to use than gold foil and gave results that are more reproducible than those produced by the other techniques mentioned.

The embodiments of the invention in which an exclusive property or privilege is claimed are defined as follows:

1. A method of determining the relative particle density as a function of position of charged particles in a beam comprising the steps of:
    a. disposing a first plurality of parallel rods in and shadowing a beam;
    b. irradiating said first plurality of rods in said beam for a predetermined time to produce transmutations to radioactive elements;
    c. removing said first plurality of rods from the beam; and
    d. measuring the radiation emitted by said radioactive elements in each rod of said first plurality of rods, which radiation in association with the known position of each rod of said first plurality of rods is a measure of the relative particle density as a function of position in said beam.

2. The method of claim 1 comprising in addition the steps of:
    a. disposing a second plurality of parallel rods in and shadowing the beam simultaneously with said first plurality of rods; said rods of said second plurality of rods being perpendicular to each rod of said first plurality of rods;
    b. irradiating said rods of said first and second plurality of rods in said beam for said predetermined time to produce transmutations to radioactive elements;
    c. removing said first and second plurality of rods from the beam; and
    d. measuring the radiation emitted by each of said first and second plurality of rods.

3. The method of claim 2 wherein said rods of said first plurality of rods are disposed in a first plane perpendicular to the beam and said second plurality of rods are disposed in a second plane perpendicular to the beam.

4. The method of claim 3 wherein said rods of said first and second plurality are aluminum rods.

5. The method of claim 1 wherein said rods of said first plurality of rods are disposed in a plane perpendicular to the beam.

6. The method of claim 5 wherein said rods are aluminum rods.

7. A method of obtaining a profile of the relative density of charged particles in a beam of charged particles comprising the steps of:
    affixing a first array of parallel rods to a first surface of a slab of polymerized methyl methacrylate;
    affixing a second array of parallel rods to a second surface of said slab, said rods of said second array disposed perpendicular to said rods of said first array;
    disposing said slab containing said first and second array in said beam perpendicular to said beam to shadow said beam with said rods;
    removing said slab from said beam;
    detaching a rod from said first and second arrays;
    noting the position of said detached rod;
    counting for a predetermined period nuclear disintegrations in said detected rod resulting from transmutations caused by said charged particles;
    repeating said steps of detaching, noting, anad counting for each rod in said first and second arrays; and
    plotting said count of nuclear disintegrations as a function of position,
    which plot is a profile of relative particle density as a function of position of the charged particles in the beam.

8. The method of claim 7 wherein said rods are aluminum rods.

9. The method of claim 8 wherein said step of counting nuclear disintegrations comprises the steps of:
    disposing a lithium-drifted germanium detector near said detached rod;
    selecting a predetermined energy range of output from said lithium-drifted germanium detector in a single-channel analyzer; and
    counting over a predetermined period the signals received from said single-channel analyzer in response to the presence of said detached rod.

10. A method of determining the relative particle density as a function of position of protons in a beam of protons comprising the steps of;
   a. disposing a first plurality of parallel rods in and shadowing said beam of protons;
   b. irradiating said first plurality of rods in said beam of protons for a predetermined time to produce transmutations to radioactive elements;
   c. removing said first plurality of rods from said beam of protons; and
   d. measuring the radiation emitted by said radioactive elements in each rod of said first plurality of rods, which radiation in association with the known position of each rod of said first plurality of rods is a measure of the relative particle density as a function of position in said beam of protons.

* * * * *